United States Patent [19]

Green et al.

[11] 4,387,533

[45] Jun. 14, 1983

[54] METHOD AND APPARATUS FOR RETAINING HEAT IN GREENHOUSE AND SIMILAR STRUCTURES

[76] Inventors: George H. Green, 207 Lake Crescent, Saskatoon, Saskatchewan, Canada, S7H 3A1; Edward A. Maginnes, 614 Acadia Dr., Saskatoon, Saskatchewan, Canada, S7H 3V9

[21] Appl. No.: 174,512

[22] Filed: Aug. 1, 1980

[51] Int. Cl.³ ............................. A01G 9/00; E04B 1/12
[52] U.S. Cl. ................................................ 47/17; 52/2; 52/22; 52/63
[58] Field of Search ................... 47/2, 17; 52/2, 22, 52/63; 135/4 R

[56] References Cited

U.S. PATENT DOCUMENTS

| | | | |
|---|---|---|---|
| 2,193,921 | 3/1940 | Gibbons | 47/17 |
| 3,481,073 | 12/1969 | Yoshida et al. | 47/17 |
| 4,064,648 | 12/1977 | Cary | |
| 4,067,347 | 1/1978 | Lipinski | 47/17 X |
| 4,073,089 | 2/1978 | Maginnes et al. | 47/17 |

FOREIGN PATENT DOCUMENTS

| | | | |
|---|---|---|---|
| 982426 | 1/1976 | Canada | |
| 1003641 | 1/1977 | Canada | |
| 96440 | 9/1963 | Denmark | 47/17 |
| 172275 | 6/1906 | Fed. Rep. of Germany | 47/17 |
| 371926 | 3/1907 | France | |
| 695829 | 9/1965 | Italy | |
| 717643 | 10/1966 | Italy | |
| 158735 | 12/1932 | Switzerland | 47/17 |

Primary Examiner—Robert E. Bagwill
Attorney, Agent, or Firm—Birch, Stewart, Kolasch & Birch

[57] ABSTRACT

An improved building, e.g., a greenhouse structure, is provided herein. It consists of an enclosure having a pair of spaced-apart walls, e.g., an outer light transparent covering and an inner light transparent membrane spaced apart from the outer covering. A fan is provided for charging the space between the covering and the membrane with air, under pressure having a dew point so selected that it will not allow condensation to take place, e.g., outdoor air, or, preferably, heated air. An insulating layer is disposed in the pressurized air space between the outer covering and the inner membrane so that it is bathed, on both its faces, with the low dew point air under pressure. The insulating layer includes an insulating blanket disposed between the outer covering and the inner membrane, and is positively movable between an extended covering position and a retracted stored position. Operating structure is connected to a leading edge of the blanket and this structure is adapted to move the leading edge from its retracted stored position to its extended covering position. Cooperative structure is provided operatively associated with the trailing portion of the blanket. This structure is adapted to draw the blanket from its extended covering position to its retracted stored position. This provides a system in which heat loss from within the structure is minimized at night and yet does not result in excessive condensation within the structure.

48 Claims, 14 Drawing Figures

METHOD AND APPARATUS FOR RETAINING HEAT IN GREENHOUSE AND SIMILAR STRUCTURES

BACKGROUND OF THE INVENTION (i) Field of the Invention

This invention relates to systems for minimizing heat loss from buildings. More particularly, it is directed to systems for selectively insulating large transparent exterior walls, e.g., the roofs and walls of greenhouses and other structures., e.g., swimming pool covers.

(ii) Description of General Problem

There are in the United States and Canada commercial greenhouses totalling over 250 million square feet. Over two-thirds of this total is in the northern United States and Canada, where greenhouses must be heated during at least some of the year. The greenhouse heating cost exceeds $120 million annually.

Most of the fuel used to heat greenhouses is expended at night. It is thought that night-time heating accounts for as much as 80% of the total heating bill. Recent increases in fuel cost, coupled with severe shortages of fuels, have faced greenhouse owners with a major problem. They must cut their total fuel consumption drastically if they wish to remain competitively viable.

The energy requirements of commercial greenhouses for heating are so high at present as to exclude economic operation of many greenhouses. One way to cut fuel consumption is to reduce the heat loss through the greenhouse walls and roof, especially at night. Insulating the walls or roof can significantly reduce heating requirements, but itself presents several potentially serious problems. An insulating system should not significantly reduce the amount of sunlight that can enter the house during the day. The insulating system may take up valuable growing space within the greenhouse. North walls and part of roofs have been insulated, but these reduce effective growing area and the production per plant because of poor light, to the point where the structure is not economic. The radiant heat loss at night can be minimized by using cloth or polyethylene screens inside the structure and these have been attempted. They fail in cold climates (i.e., below −18° C.) because the moisture-laden air creeps around the screen and forms frost on the inside cover of the greenhouse. Often this falls off when the sun warms the roof and walls, thereby damaging the plants as well as creating a hazard for workers. If it does not, the resulting chill from the cold air above the screen reduces the crop yield significantly (e.g., 10 to 15%). Outside shutters have also been tried but wind problems and economics exclude this type of arrangement in commercial greenhouses although feasible in back yard greenhouses. Accordingly, an insulating system should be readily adaptable for use with greenhouses of widely varying size and construction, and should cover a large area rather than requiring many small systems installed between each pair of obstructing greenhouse supports.

(iii) Description of the Prior Art

Many systems have been proposed to control the temperature within greenhouses. Thus, French Patent No. 371,926 dated Mar. 19, 1907 provides a system in which shades are provided which can be rolled up or down the exterior arched transparent walls of greenhouse structures.

Italian Patent No. 695,829 dated Sept. 27, 1965 provides a system in which shades are drawn within the inside of the greenhouse structure, the shades being in the form of a movable horizontal ceiling.

Italian Patent No. 717,643 dated Oct. 15, 1966 provides a system in which shades are drawn across the transparent portion of the greenhouse parallel to the sloping roof thereof to provide an internal, dropped shielding ceiling.

Canadian Patent No. 982,426 issued Jan. 27, 1976 to R. Delano et al provides a method of protecting greenhouses involving coating the inside transparent surfaces of the greenhouses with a coating which is translucent, so that the amount of light permitted therethrough is controlled by the thickness and density of the coating and which, when wet, becomes almost transparent, permitting the passage of considerably more light therethrough than when dry. The humidity of the interior of the greenhouse, which was alleged to vary from high on cloudy days to low on sunny days, was said automatically to control the amount of light entering the greenhouse.

Canadian Patent No. 1,003,641 issued Jan. 18, 1977 to H. Grossman et al provided a shade-providing system including at least one powered track on which a drape or shade cloth was supported for covering an area. The powered track included a self-contained motor means having a track guiding means for drawing the shade cloth between a gathered stored position and to an extended position for shading a selective area. The shade system could also include suspension tracks spaced from the powered track means for maintaining the shade cloth or panel elevated above the benches. The suspension tracks were said to be devoid of any actuating means and served merely as a support and guide for the shade cloth.

U.S. Pat. No. 4,064,648 issued Dec. 27, 1977 to C. L. Cary provided an insulating system for reducing heat loss from a structure during one part of the day and for permitting light to enter the structure during another part of the day. This system included a roll mounted within the structure, a flexible sheet of material wound around the roll, a structure for supporting the roll immediate its length and engaging portions of the wound sheet, and means both for unwinding the sheet from the roll and deploying it in a plane and for rotating the roll to rewind the sheet therearound.

Canadian Patent No. 1,043,070 issued Nov. 28, 1978 to M. Dube provided a system of filling double-glazed building panels with insulating light-weight granular material for the purpose of providing insulating shading or privacy and for evacuating such material therefrom when light transmission was to be restored. The system included a container for the material, a header for through-flow of gas-conveyed granular material into and from the space between the double-glazed unit, and blower means and controls therefor for conveying the granular material into the space and for retaining it therein by gaseous pressure.

U.S. Pat. No. 4,067,347 issued Jan. 10, 1978 to Lipinski provided a portable solar-heated shelter comprising at least one fixed roof layer and a second mechanically supported roof layer which can be selectively employed to vary the thermal characteristics of the shelter. The second roof layer was adapted to be unwound from a storage spool and drawn into a take-up spool, passing over the first roof layer, by a cranking action. The second roof layer included a first sunshade portion and a series connected heat insulative portion of opaque material which may be selectively deployed to control the thermal characteristics of the enclosure.

Canadian Patent No. 1,054,081 issued May 8, 1979 to D. M. Fraioll provided a double wall fabric panel unit supported by pressurized air pumped into the interior thereof, with insulation provided in the double walled panels by including a plastic coated fabric panel and a thermal liner panel, with said edge strips being discontinuous to provide spaced air passageways to vent air from between the panels as the unit is rolled.

While the teachings of U.S. Pat. Nos. 4,067,347 (Lipinski) and 4,064,648 (Cary), described above, provided a movable insulation to allow entrance of light in day and provide insulation at night, the Lipinski and Cary approaches are uneconomical because of their complexity and have one basic failing, namely, that they do not protect against formation of frost or ice within the structure but outside of the insulating layer.

Moreover, Cary does not provide a movable insulation outside the usable space. The system taught by Cary is very difficult and expensive to install. Installed within a greenhouse, it will be extremely difficult to overcome the infiltration of warm, moist air above the flexible material at night which will freeze on the mechanism or the roof. In cold climates (e.g., as in Canada and the northern United States), this system will not prevent the freezing problem, and in addition, it will create a cold mass of air above the blanket that will fall once the blanket is withdrawn, and result in chilling that will impede the growth of greenhouse crops. Cary attempts to overcome the icing and snow accumulation on the outside of the roof by automatically retracting the blanket.

Lipinski provides for the placement of the insulating barrier between unpressurized flexible roof layers. The system, however, will fail in cold freezing climates since any small hole (either accidental or otherwise) will allow the warm moist air to penetrate into the space between his roofs, freeze onto the mechanism, tear the walls and immobilize the blanket. Its very nature only allows it to be used on structures of short length, i.e., movable shelters.

SUMMARY OF THE INVENTION

(i) Aims of the Invention

Accordingly, a broad object of this invention is to provide a system which has great economic significance for the greenhouse industry, is practical, economical and immediately usable.

Another object of this invention is to provide such a system which is simple and hence which has a very high potential in the market place for all countries with cold climates.

Another object of this invention is to provide such a system which includes an automatic retraction device.

Still another object of this invention is to provide such a system whereby snow on the greenhouse is caused to melt or fall off naturally by retracting the blanket and by inflation and/or mechanical pulsations.

(ii) Statement of Invention

This invention provides a structure comprising: (A) an enclosure having an outer light-transparent wall and an inner light-transparent wall spaced apart from that outer wall: (B) means for charging the space between the outer wall and the inner wall with air upper pressure, the air having a dew point so selected that it will not allow condensation to take place under pressure; (C) and an insulating layer disposed in, and bathed on both its side faces by the pressurized air in the space between the outer wall and the inner wall, the insulating layer comprising an insulating blanket which is situated in the pressurized air space which exists between the outer wall and the inner wall the insulating blanket having a leading edge and a trailing portion and being movable between an extended covering position and a retracted stored position within an enclosed storage area; (D) means connected to the leading edge of the insulating blanket and positively operable to move the leading edge from its retracted stored position to its extended covering position; and (E) means operatively associated with the trailing portion of the insulating blanket and adapted to draw the insulating blanket from its extended covering position to its retracted stored position.

(iii) Other Features of the Invention

The pressurized air space may be disposed only in a horizontal or approximately horizontal position, in which case the insulating blanket is drawn across the horizontal area by carrier cables from an accordion-folded retracted stored position to an extended covering position, and vice versa, and with the leading edge at any selected position between extended and retracted.

The horizontal-type situation would be, for example, on a gutter-connected, pillow-type open greenhouse.

By such feature, the greenhouse of the gutter-connected pillow-type, open-type includes a roof of a plurality of inflated double-walled polyethylene pillows.

By another feature thereof, the insulating blanket is supported at spaced-apart locations throughout its length by carrier cables, the carrier cables being movable in both directions under constant tension to extend or to retract the insulation blanket.

Another situation where the insulating blanket is drawn across a roof structure is when it is disposed in a metal arch gutter-connected greenhouse. The insulating blanket would move in a generally one-half sinusoidal path.

By yet another feature, the greenhouse of the metal arch gutter-connected type includes an inner transparent layer of polyethylene resting on the metal arched frames and separated from the outer polyethylene arch by the outside air under pressure.

By a feature thereof, the insulating blanket is supported by three longitudinally extending cables, which are under tension to enable movement of the blanket, but which, when relaxed, allow the insulation blanket to rest on the inner polyethylene layer to provide the covering insulation.

By a further feature thereof, the blanket is provided with carrier cables, the carrier cables being movable transverse of and within the arches in both directions under constant tension to extend or to retract the insulation blanket.

If the greenhouse is a steep roof type or quonset hut type, the trailing edge is provided with a ballast weight or tension device, e.g., an electric tension cord to draw the blanket into a lower storage box. The storage box may or may not be insulated.

If the greenhouse is of the flat roof type, the insulating blanket is controlled by a two-rope constant-tension system. The insulation may be one extensive width or be of a plurality of butted batts of insulating blankets.

By another feature, the greenhouse is of the very flat roof hoop-type, and includes a plurality of such butted batts of insulation blankets, with extension and retraction being accomplished by a rope secured at one end to the leading edge of the insulation blanket and at its other end wrapped in one direction on a rotatable shaft, and a second rope wrapped in an opposite direction to the rotatable shaft and trained around a lower pulley and secured to a lower pull bar on the insulation blanket.

By yet another feature, in a very flat roof type greenhouse, a pair of rollers are provided engaging opposite faces of the insulation blanket to hold the insulation blanket to the vertical wall.

By yet another feature, the greenhouse is of the quonset hut type and the extension and retraction of the insulation blanket is accomplished by a continuous rope, entraining a plurality of pulleys within the greenhouse, wound around a rotatable winding shaft and each end connected to the leading edge of the insulation blanket.

By another feature, the operating means comprises a motor manually actuatable to move the insulating blanket to a selected position between its extended covering position and its retracted stored position, and to hold the blanket at that selected position.

By another feature, the operating means comprises a motor automatically actuatable in response to a preselected cycle automatically to move the insulating blanket in response to predetermined positions of the sun with respect to the greenhouse.

By a further feature thereof, one longitudinal half of the greenhouse has its insulating blanket in its extended covering position while the other longitudinal half of the greenhouse has its insulating blanket in its retracted stored position.

By another feature, one longitudinal half of the greenhouse has its insulating blanket movable between its extended covering position to its retracted stored position, while the other longitudinal half of the greenhouse has its insulating blanket movable between its retracted stored position and its extended covering position.

By a further feature, the greenhouse is of the hoop-type and includes an arched framework, an outer light-transparent covering thereover, a spaced-apart, inner, light-transparent membrane thereover, and fan means for inflating the space between the outer covering and the inner membrane with outside air.

By yet another feature, the fan means introduces air into one of the storage boxes or above the boxes, or at any other convenient location.

By still another feature, the fan means introduces air into a header disposed at the apex crest of the arched structure, between the outer covering and the inner membrane.

By yet another feature of such greenhouse, the outer covering and the inner membrane each comprise a polyethylene sheet.

By another feature, the greenhouse is of the rigid transparent type, e.g., glass plates and an outer skin of flexible transparent plastic sheet disposed in spaced-apart relation from the rigid transparent, e.g., glass plates between the base of the structure and the apex of the roof thereof, and includes fan means for introducing the outside air under pressure between the rigid transparent, e.g, glass plates and the transparent skin to provide a double walled unit.

By another feature, the rigid transparent plates are, e.g., flat or corrugated sheet material made of glass fibers.

By another feature thereof, the fan means pressurizes the space of the storage boxes or above the boxes or at any other convenient location under conditions of zero or approaching zero flow, in order to minimize heat transfer and minimize fan power.

By another feature, the insulating blanket includes a pair of sealing skins with a filling of insulating material therebetween.

By a further feature thereof, one skin is formed of a pliable waterproof material, e.g., polyethylene or polyvinyl plastic.

By another feature, one skin is formed of an aluminized material.

By a further feature, the filling of insulating material is formed of a structurally integral glass fiber blanket.

By yet another feature, the insulating blanket includes a further portion comprising a mesh material to provide shading to restrict the amount of light entering the greenhouse.

(iv) Generalized Description of the Invention

Accordingly, this invention addresses itself to several critical problems, namely, reduction of light by north wall insulation, the formation of ice on the structure covering and morning chill of crop, and wind problems and the economics, and substantially overcomes such problems by a movable layer of flexible insulation placed between the two spaced-apart walls of the greenhouse which are charged with pressurized air, depending on light and temperature conditions, to minimize heating requirements. The inside cover of the insulation is preferably covered with a light-reflecting material, e.g., reinforced aluminized material, to enhance light conditions when partially covered.

The provision of the pressurized zone of gas between the outer and inner walls has the following advantages:

(1) It substantially eliminates any freezing problem in the space containing the insulation since outdoor air entering into the structure is dry and substantially prevents moisture penetration into the space from the interior.

(2) Because of the pressurization, a space is provided which is free of structure, that easily accommodates thick or thin insulation (up to 3" or more in thickness) and provides a space for a suitable windup mechanism. It can accommodate any length of greenhouse. The standard 100' greenhouse could thus use two 50' systems or any number of smaller sizes modular systems. (3) The complicated storage device is eliminated. In one embodiment, the insulation folds under the action of gravity, which effectively eliminates the lower roller.

(4) The system can be installed on an existing greenhouse structure with minor modifications.

(5) The system can preferably be automated so that the insulation covers the greenhouse as night comes and lowers at dawn.

(6) The inflated layer contains dry air since the inflation is accomplished with outdoor air and no significant frost formation can occur.

The insulation is protected from the wind since it rests on the inner wall in a smooth channel free of obstructions so that a movable insulating blanket may be drawn up at night and let down in the day. The insulation is preferably a flexible glass fiber insulation with a reinforced light reflection backing which allows pulling of the flexible blanket.

Maximum effective light for growing with minimum heating is achieved by drawing the insulating blanket part way up during early morning or late afternoon.

BRIEF DESCRIPTION OF THE DRAWINGS

In the accompanying drawings.

DESCRIPTION OF PREFERRED EMBODIMENTS

Figure 1:
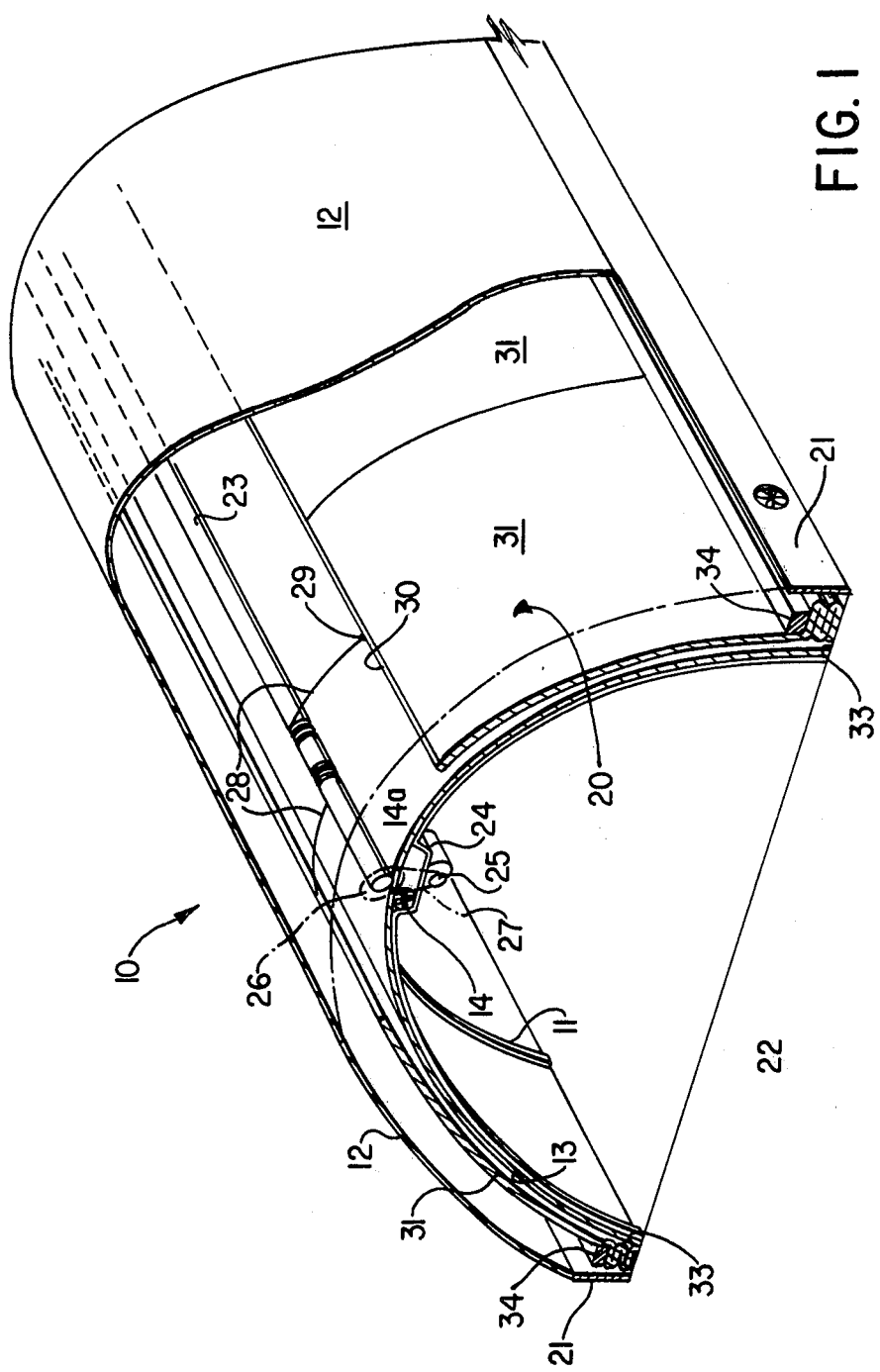
FIG. 1 is a perspective view of the greenhouse of one embodiment of the present invention.
Figure 2:
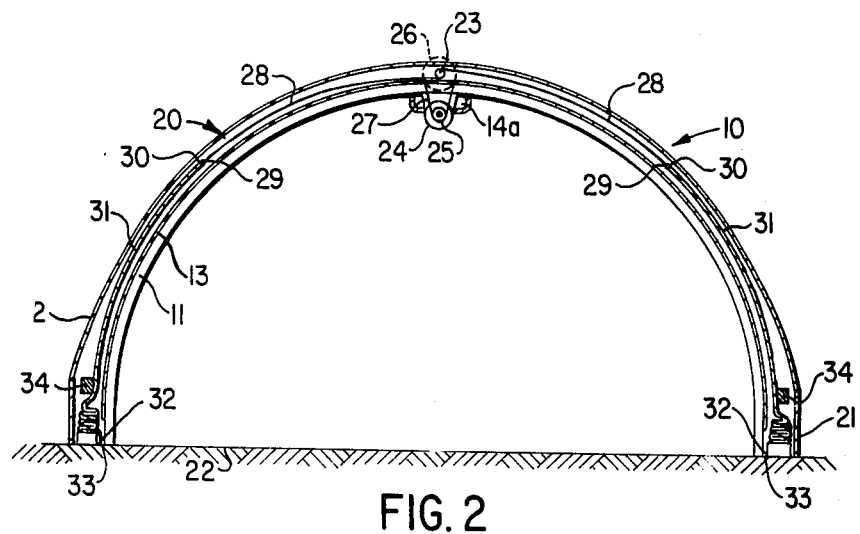
FIG. 2 is a transverse cross section through the embodiment of FIG. 1.

(i) Description of FIGS. 1 and 2

As seen in FIGS. 1 and 2, the greenhouse structure 10 includes an arched framework 11 supporting an outer transparent covering 12 e.g., of polyethylene film or rigid preformed glass or polyethylene sheet and an inner transparent membrane 13 e.g., of polyethylene film or rigid preformed glass or polyethylene sheet. A fan 14 fills the space between outer covering 12 and inner transparent membrane 13 with pressurized air, e.g., dry outdoor air drawn in through end wall inlets to a header 14a, which air may be heated air in order to heat the greenhouse in winter. Alternatively, the fan 14 may drawn in outside ambient air through a vaned aperture at the base of storage box 21.

The insulation system 20 of an embodiment of this invention includes a storage box 21 (which may or may not be insulated) at the base 22 of the greenhouse 10 and a longitudinal roller 23 at the crest of the greenhouse 10. A reversing motor 24 is provided having a sprocket 25 thereon driving a sprocket 26 on the roller 23 by means of a chain 27 or alternatively by a direct drive to the roller 23. Secured and entrained on roller 23 is a plurality of ropes 28 whose free ends 29 are secured to the upper edge 30 of an insulation blanket 31. The lower edge 32 of the insulation blanket 31 is secured to the bottom 33 of the storage box 21 (which may or may not be insulated) and is also provided with a longitudinally extending lower ballast weight 34. Ballast weight 34 should be located about 3 feet above the ground level 33 in order to pull the blanket 31 in its initial stages.

(ii) Operation of Embodiment of FIGS. 1 and 2

In operation, rotation of the motor 24 in one direction causes the ropes 28 to wind up on the roller 23, thereby drawing the insulation blanket 31 up to its extended covering position against the force exerted by the weight of the blanket 31 and the weight of the ballast 34. Rotation of the motor 24 in the reverse direction allows the blanket 31 to be drawn down by its own weight and the weight of the ballast 34 into the storage box 21 (which may or may not be insulated) in a natural accordion-type fold to its retracted stored position.

While the description of the operation has referred to rolling and unrolling the insulation blanket, such operation may embody several options. The motor may be manually actuatable to move the insulating blanket to a selected position between its extended position and its retracted stored position, and to hold the insulating blanket at that selected position. The motor may be automatically actuatable in response to a preselected cycle automatically to move the insulating blanket in response to predetermined positions of the sun with respect to the structure. In its operation, one longitudinal half of the structure may have its insulating blanket in its extended covering position while at the same time the other longitudinal half of the structure has its insulating blanket in its retracted position. Finally, in its operation, one longitudinal half of the structure may have its insulating blanket at an intermediate position between its extended covering position and its retracted stored position, while at the same time the other longitudinal half of the greenhouse has its insulating blanket at an intermediate position between its retracted stored position and its extended covering position.

Figure 3:
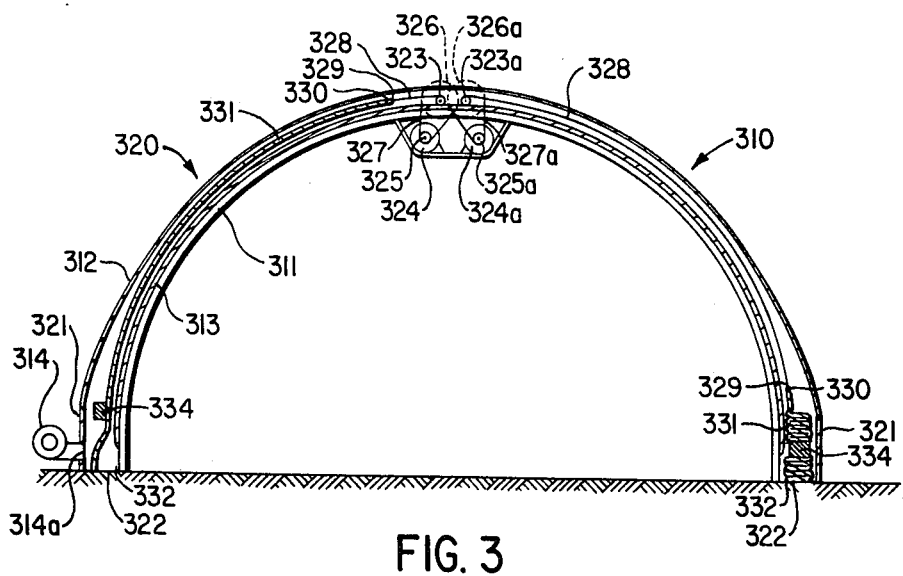
FIG. 3 is a transverse cross section through a greenhouse of a second embodiment of this invention.

(iii) Description of FIG. 3

As seen in FIG. 3, the greenhouse 310 includes an arched framework 311 supporting an outer transparent covering 312 and an inner membrane 313. The outer transparent covering 312 and the inner membrane 313 may be made of the same material as described for members 12 and 13 in FIG. 1. A fan 314 fills the space between outer coverings 312 and inner membrane 313 with outside air through an inlet 314a at the bottom 322 of the storage box 321 (which may or may not be insulated), which air may be heated air in order to heat the greenhouse 310 in winter.

The insulation system 320 of an embodiment of this invention includes a storage box 321 (which may or may not be insulated) at the base 322 of the greenhouse 310 and a longitudinal roller 323 at the crest of the greenhouse 310. A reversing motor 324 is provided having a sprocket 325 thereon driving a sprocket 326 on the roller 323. In another alternative, a pullcord (not shown) may be used for manual operation. The roller 323 may be located either between the covering layers 312 and 313, or outside the inner layer of the greenhouse 310. Secured and entrained on roller 323 is a plurality of ropes 328 whose free ends 329 are secured to the upper edge 330 of an insulation blanket 331. The lower edge 332 of the insulation blanket 331 is secured to the bottom 322 of the storage box 321 (which may or may not be insulated) and is also provided with a longitudinally extending lower ballast 334.

(iv) Operation of Embodiment of FIG. 3

In operation, rotation of the motor 324 in one direction causes the ropes 328 to wind up on the roller 323, thereby drawing the insulation blanket 331 up to its extended covering position against the force exerted by the weight of the blanket 331 and the weight of the ballast 334. Rotation of the motor 324 in the reverse direction allows the blanket 331 to be drawn down by its own weight and the weight of the ballast into the storage box 321 (which may or may not be insulated) in a natural accordion-type fold to its retracted storage position. As shown, however, the greenhouse 310 is so fitted with two rollers that one longitudinal half has its blanket in the lower retracted stored position to allow early morning sun to enter the greenhouse, while the other longitudinal half has its insulation blanket in its upper extended covering position. The blankets are switched in their dispositions as the day progresses.

The blanket falls within the storage box 321 (which may or may not be insulated) due to its own weight and the weight of the ballast 334. It may be guided by means of tracks (not shown) at the ends of or in the greenhouse.

While not specifically shown here, the blanket may include an extension of a mesh material to provide shading to restrict the amount of light (and thus heat) entering the greenhouse. Thus, the blanket system may be useful for cooling as well as for retaining heat.

Figure 4:
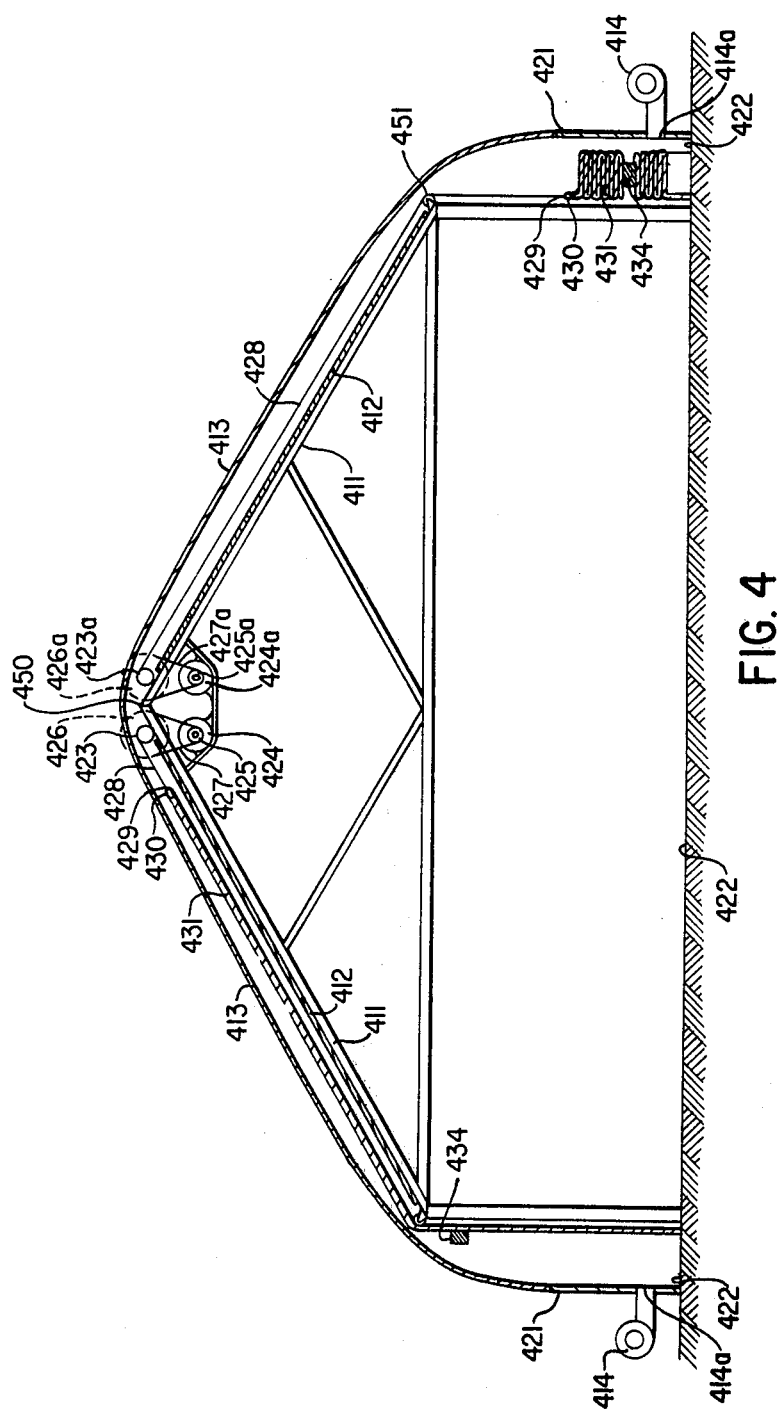
FIG. 4 is a transverse cross section through a greenhouse of a third embodiment of this invention.

(v) Description of FIG. 4

As seen in FIG. 4, the greenhouse 410 includes a standard glass framed greenhouse 411 including an inner rigid series of panels 412 (which may be either of glass or of transparent plastic). It is modified by an outer transparent covering 413 of polyethylene sheet, joined to the storage box 421 (which may or may not be insulated) at its lower end, and to the apex 450 of the greenhouse 410 at its upper end. A fan 414 fills the space between inner coverings 412 and outer membrane or membranes 413 through an inlet 414a at the bottom 422 of the storage box 421 (which may or may not be insulated), which air may be heated air in order to heat the greenhouse 410 in winter.

The insulation system 420 of an embodiment of this invention includes a storage box 421 (which may or may not be insulated) at the base 422 of the greenhouse 410 and a longitudinal roller 423 at the crest of the greenhouse 410. A reversing motor 424 is provided having a sprocket 425 thereon driving a sprocket 426 on the roller 423 by means of a chain 427 or alternatively by direct drive to the roller 423. Secured and entrained on roller 423 is a plurality of ropes 428 whose free ends 429 are secured to the upper edge 430 of an insulation blanket 431. The lower edge 432 of the insulation blanket 431 is secured to the bottom 422 of the storage box 421 (which may or may not be insulated) and is also provided with a longitudinally extending lower ballast 434.

(vi) Operation of Embodiment of FIG. 4

In operation, rotation of the motor 424 in one direction causes the ropes 428 to wind up on the roller 423, thereby drawing the insulation blanket 431 up to its extended covering position against the force exerted by the weight of the blanket 431 and the weight of the ballast 434. Rotation of the motor 424 in the reverse direction allows the blanket 431 to be drawn down by its own weight and the weight of the ballast 434 into the insulated storage box 421 (which may or may not be insulated) in a natural accordion-type fold to its retracted stored position. The insulation takeup can be either accordion fold (as described) or on a roller (not shown). As shown, however, the greenhouse 410 is so fitted with two rollers that one longitudinal half has its blanket in the lower retracted stored position to allow early morning sun to enter the greenhouse, while the other longitudinal half, on a second roller, has its insulating blanket in its upper extended covering position. The insulating blankets are switched in their dispositions as the day progresses.

The insulating blanket 431 falls within the storage box 421 (which may or may not be insulated) due to its own weight and the weight of the ballast 434. It may be guided by means of tracks at the ends and rollers 451 at the sides of the greenhouse.

Figure 5:
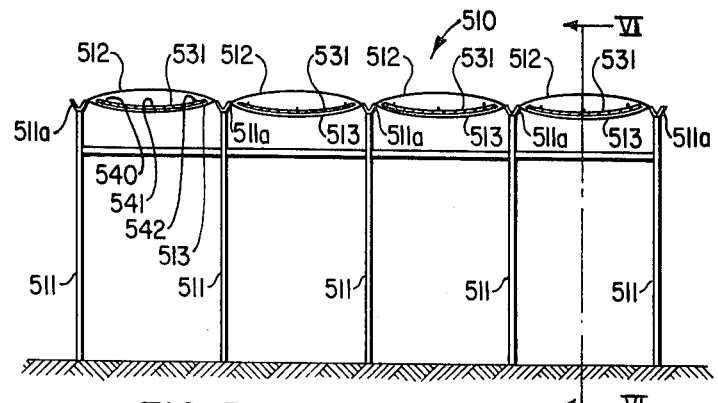
FIG. 5 is a front elevational view of a gutter-connected pillow-type open greenhouse of another embodiment of this invention.
Figure 6:
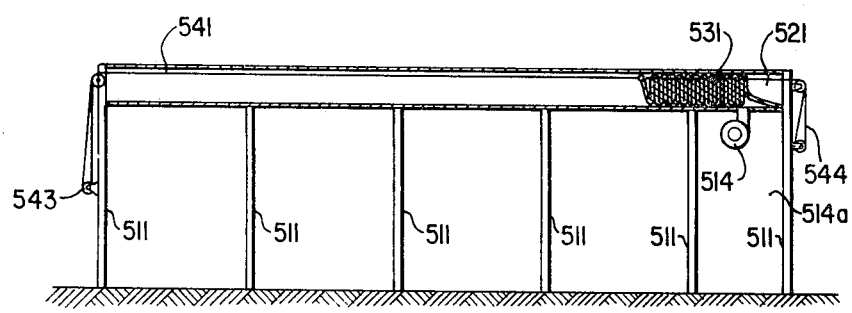
FIG. 6 is a side elevational view of the embodiment of FIG. 5.
Figure 7:
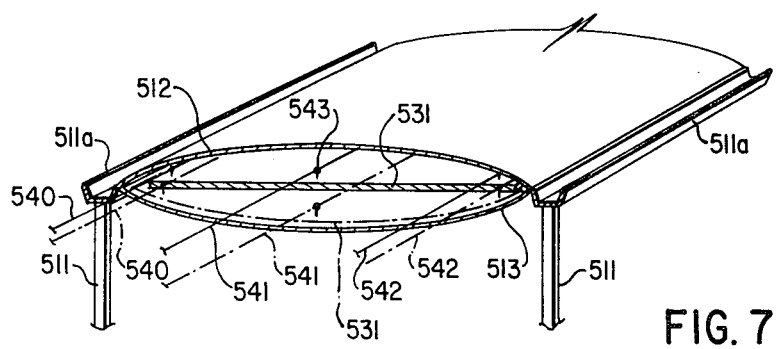
FIG. 7 is a detail of the embodiment of FIG. 5 showing the disposition of the insulating blanket and the extension and retraction thereof.

(vii) Description of FIGS. 5, 6 and 7

The greenhouse 510 of FIGS. 5, 6 and 7 includes a plurality of upright columns supporting gutters 511a which, in turn, support a plurality of inflated pillow polyethylene covers comprising an outer skin 512 and inner skin 513. A fan 514 within a header house or non-greenhouse structure 514a fills the space between outer skin 512 and inner skin 513 with outside air, which air may be heated air in order to heat the greenhouse 510 in winter.

The insulation system of an embodiment of this invention includes a horizontal storage box 521 above the header house 514a. An insulation blanket 531 extends across the inflated pillow covers. Three ropes or cables 540, 541, 542 which extend longitudinally of the greenhouse and are anchored to a cross-brace at both ends of the greenhouse 510 (not shown) to support the insulation blanket 531 with grommets 543 for vertical movement between a tensed condition, (in which the inflated pillow is not covered by the insulation blanket 531 for insulation purposes) and a relaxed condition (in which the insulation blanket 531 is resting on the inner skin 513 for insulation purposes). One such cable tensioning device may be a hydraulic cylinder whose rod end is provided with a pulley entrained by the cable. Another cable 544 may be a moving device.

(viii) Operation of Embodiment of FIGS. 5, 6 and 7

The insulation blanket 531 may be retracted to the accordion folded condition shown in FIG. 6 by drawing a clamp (not shown) at the leading end of the respective cable from the forward end of the greenhouse 510 to the storage end at the storage box 521.

Figure 8:
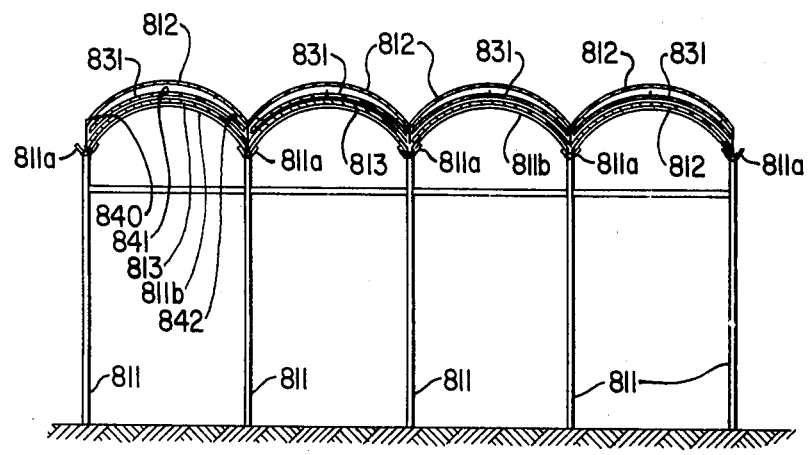
FIG. 8 is a front elevational view of a metal arch gutter-connected greenhouse of yet another embodiment of this invention.
Figure 9:
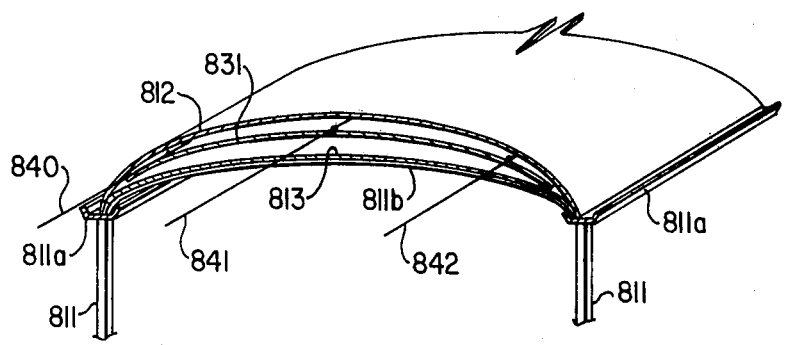
FIG. 9 is a detail of an arch of the embodiment of FIG. 8, showing the disposition of the insulation blanket.

(ix) Description of FIGS. 8 and 9

The embodiment of greenhouse 810 shown in FIGS. 8 and 9 is virtually the same as that shown in FIGS. 5, 6 and 7 and so the same parts will be designated on the drawings by the same reference numeral in the "800" series rather than the "500" series but will not be described in detail. The only significant difference between the "500" embodiment and the "800" embodiment is that the metal arch gutter-connected greenhouse of FIGS. 8 and 9 includes a metal arch framework 811b interconnecting the gutters 811a resting atop the gutter support columns 811. The outer skin 812 is fixed to the gutters 811a spaced away from the metal arch framework 811b, while the inner skin 813 rests on the metal arch 811b.

(x) Operation of Embodiment of FIGS. 8 and 9

The construction and operation of the insulation blanket 831 is the same as in the embodiment of FIGS. 5, 6 and 7.

Figure 10:
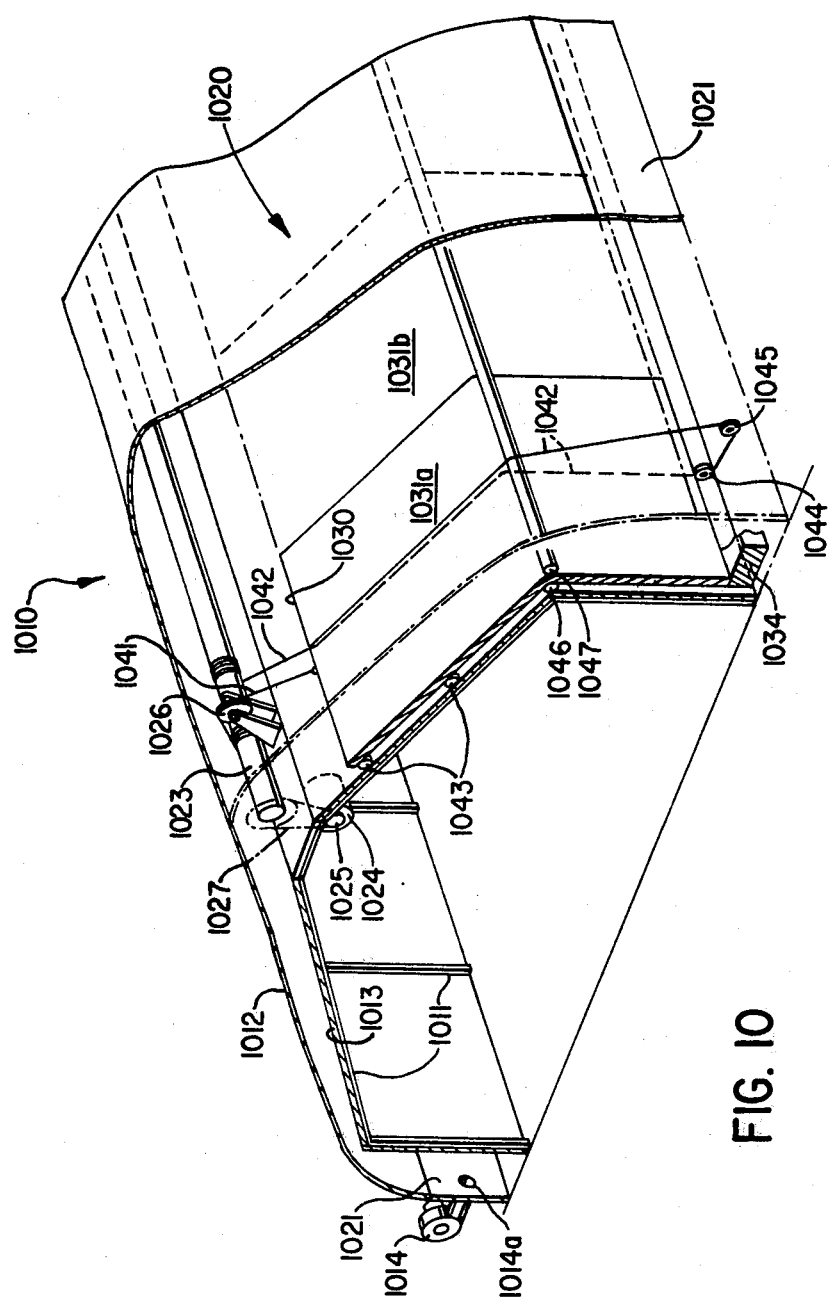
FIG. 10 is a perspective view of a greenhouse of still another embodiment of this invention which is a variation of the embodiment of FIG. 1.
Figure 11:
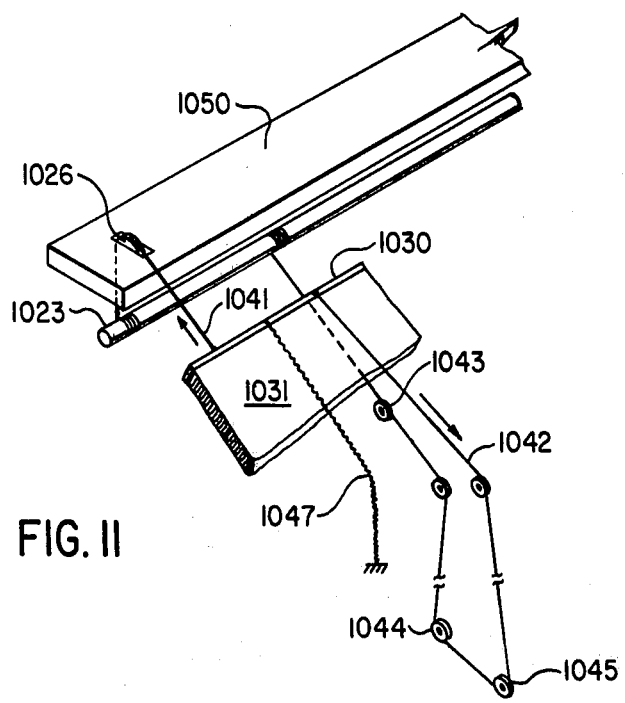
FIG. 11 is a perspective detail view showing the extension and retraction of the insulation blanket.
Figure 12:
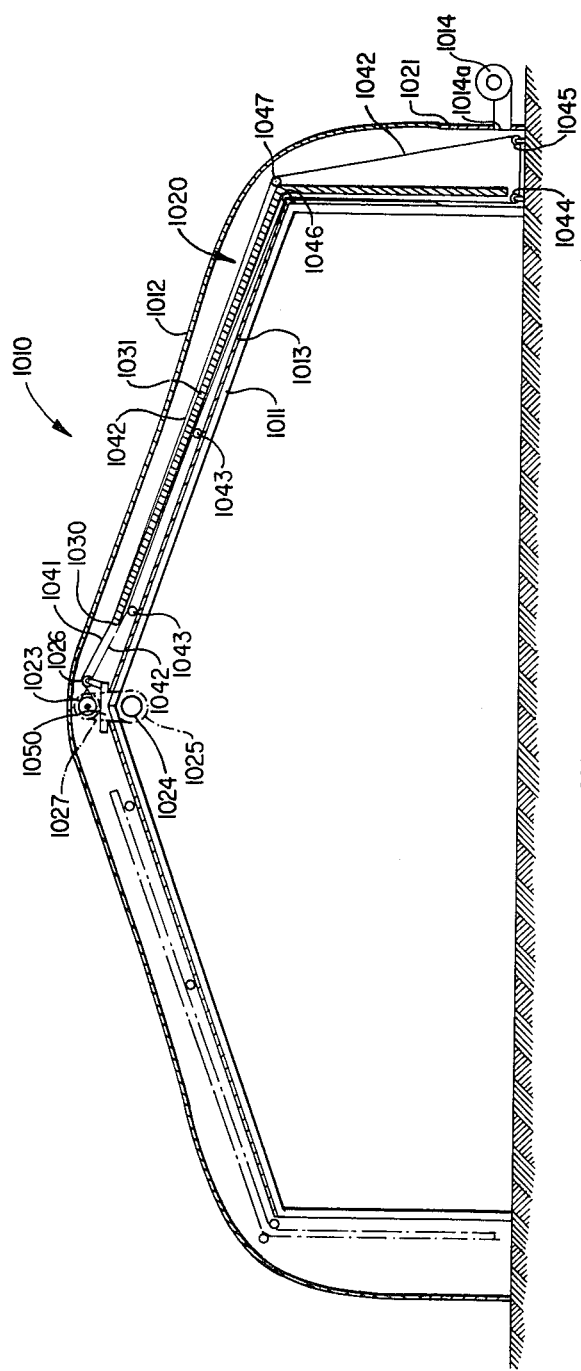
FIG. 12 is a transverse cross section through the embodiment of FIG. 10.

(xi) Description of FIGS. 10, 11 and 12

The embodiment shown in FIGS. 10, 11 and 12 is virtually the same as the embodiment shown in FIG. 1 and hence the same parts will be designated on the drawings by the same reference numeral in the "1000" series rather than in the "10" series, but will not be otherwise described. Because the greenhouse 1010 is a very flat roof quonset hut type greenhouse, a different extension-retraction system is used.

The greenhouse 1010 shown in FIGS. 10–12 comprises a framework in the form of a plurality of spaced apart "A" frame members 1011 connected together at their apices by a longitudinally extending ridgeboard 1050. The inner transparent membrane 1013 may be formed of light-transmitting polyethylene film or it may be formed of thin but rigid glass. The outer transparent covering 1012 may be formed of a polyethylene film, but preferably is of a rigid light-transmitting material, e.g., glass or preformed polyethylene sheets. The lower portion at each base of the frames 1011 define the storage box 1021.

A fan 1014 draws in dry air and discharges it under pressure into the space between inner membrane 1013 and outer transparent covering 1012, via portion 1014a. The air may be dry ambient air drawn from outdoors, or from a source of dry heated air (not shown).

The insulation blanket 1031 is provided as a plurality of narrow edge butted batts 1031a, 1031b, 1031c, etc. and are extended and retracted by a two-rope system. One rope 1041 is connected to the leading edge 1030 of insulation blanket batt 1031a and extends to a pulley 1026a, mounted on the ridgeboard 1050 and then is wound on a winding shaft 1023 driven by a reversing motor 1024 via drive pulley 1025 entraining a driven pulley secured in winding shaft 1023 by a belt 1027. A second rope 1042 is wound on winding shaft 1023 in an opposite direction and extends within the inner polyethylene or glass membrane 1013 guided by pulleys 1043 (supported on membrane 1013) to the storage box 1021 where it is guided by pulley 1044 and 1045 within the pressurized air layer to be secured to the leading edge 1030 of the insulating blanket batt 1031a.

As also seen in FIG. 12 at the junction of the roof and the wall, the insulation blanket batts 1031a, etc. pass on the outside of roller 1046 and on the inside of roller 1047 in order to hold the insulation 1031a, etc. tight to the wall. An alternative retraction system is a tension device (e.g., a stretchable rope) 1047 pulled tight on raising the insulation 1031.

(xii) Operation of the Embodiment of FIGS. 10, 11 and 12

Thus, rotation of the winding shaft 1023 in one direction results in extension of the insulation blanket batt 1031a to its covering position, while rotation of the winding shaft 1023 in an opposite direction results in retracting the insulation blanket batt 1031a within storage box 1021 in accordion folded form. The ropes 1041 and 1042 are maintained under constant tension to facilitate accurate operation. The other insulation blanket batts 1031b, 1031c, etc. are operated in a like fashion.

Figure 13:
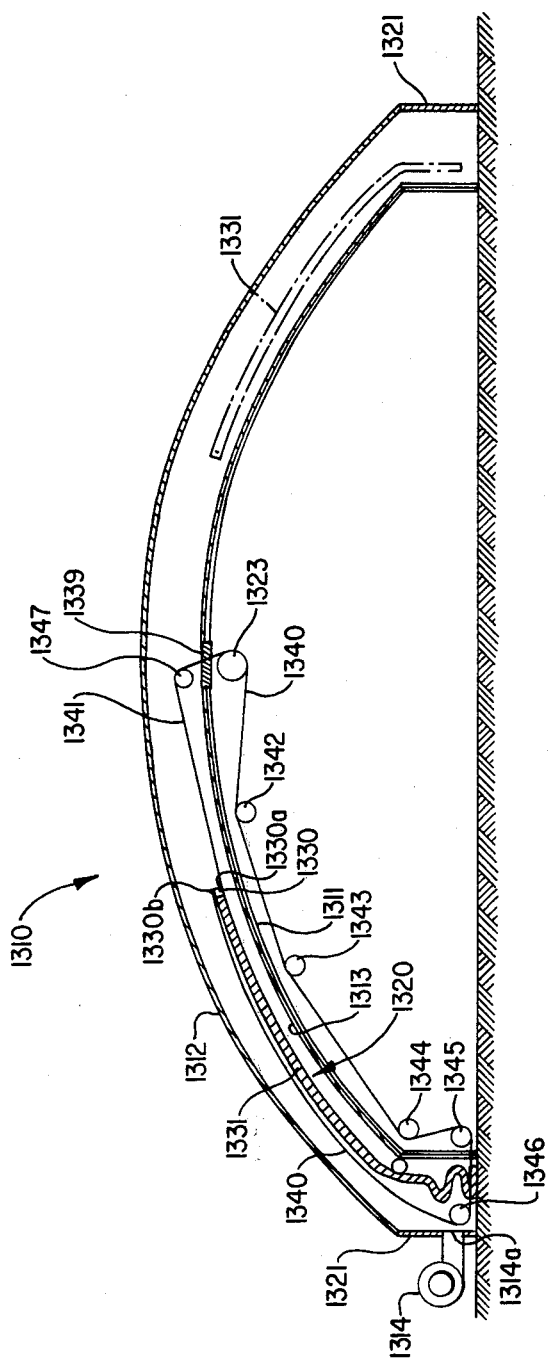
FIG. 13 is a transverse cross section through yet another embodiment of this invention which is another variation of the embodiment of FIG. 1.

(xiii) Description of FIG. 13

The embodiment shown in FIG. 13 is virtually identical to the embodiment shown in FIG. 1 and hence the same parts will be designated on the drawings by the same reference numeral in the "1300" series rather than the "10" series, but will not be otherwise described. Because the greenhouse 1310 is a very flat roof quonset hut type greenhouse, a different extension-retraction system is used.

The greenhouse 1310 shown in FIG. 13 comprises a framework in the form of a plurality of arched frames 1311, each having a lower vertical segment which are transversely spaced apart. The arched frames 1311 are connected at their apices by a longitudinally split, longitudinally extending ridgeboard 1339. The inner transparent membrane 1313 may be formed of light-transmitting polyethylene film or it may be formed of thin rigid glass or polyethylene plate. The outer transparent covering 1312 may be formed of polyethylene film, in which case it is supported above the inner membrane 1313 by pressurized air, or it may be preformed rigid glass or polyethylene sheet. The lower portion at each base of the frames 1311 define the storage box 1321.

A fan 1314 draws in dry air and discharges it under pressure into the space between inner membrane 1313 and outer covering 1312, via port 1314a. The air may be dry ambient air drawn from outdoors, or from a source of dry heated air (not shown).

The insulation blanket 1331 is extended and retracted by a continuous rope system. The rope 1340 is secured to the inside edge 1330a of the leading edge 1330 of the insulation blanket 1331. It then passes a pulley 1347 in the pressurized air space above the ridgeboard 1339, then passes through a longitudinal slot (not shown) in the ridgeboard 1339 to the greenhouse space proper where it is wound on winding drive shaft 1323 driven by a motor as previously described. Now within the interior of the greenhouse 1310, the rope 1340 is guided by pulleys 1342–1345 to the bottom interior of the greenhouse 1310. Then it passes through the inner membrane 1313 to the pressurized air space and into the storage box 1321 where it is guided by pulley 1346. The rope 1340 fits between the insulation blanket batts 1331 and the outer covering 1312 in the pressurized air space and is secured to the outside edge 1330b of the leading edge 1330 of the insulation blanket. The leading edge 1330 is preferably a pull bar.

The rope 1340 is preferably a woven band (e.g., a 2"×1/16") which minimizes wear on the polyethylene and rolls on the shaft without sideways movement.

(xiv) Operation of the Embodiment of FIG. 13

Thus, rotation of the winding shaft 1323 in one direction results in extension of the insulation blanket batt 1331, while rotation of the winding shaft 1323 in the opposite direction results in retracting the insulation blanket batt 1331 within the storage box 1321 in accordion folded form.

Figure 14:
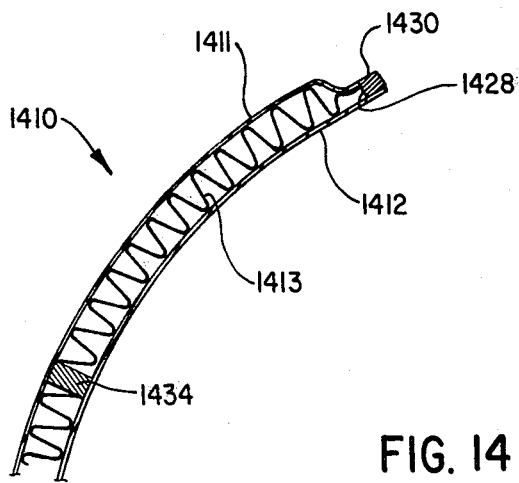
FIG. 14 is a cross section through a typical insulating blanket used in the greenhouse of embodiments of this invention.

(xv) Description of FIG. 14

As seen in FIG. 14, a typical blanket 1431 includes one skin 1441 of a pliable waterproof material, e.g., polyethylene or polyvinyl plastic film, and another skin 1442 of aluminized material. Between the skins is the insulation material, preferably a self-sustaining flexible pad of glass fibers. The ballast weight 1434 at the bottom but which is preferably about 3 feet off the ground 1433 is also shown.

SUMMARY OF ADVANTAGES OF THE INVENTION

The economics of the system of this invention projected from the cost of the present systems is about $28,000 per acre, while saving $24,000 per year in natural gas fuel bills, (at Western Canada prices). At the present price of oil, the cost of the system would be repaid in less than one year.

The disposition of the insulation outside the greenhouse structure proper in a pressurized zone rather than in the unpressurized zone described by Cary provides a significant advance over the prior art. The improvement can be used with greenhouses with inflated polyethylene outer layers or existing glasshouses with inflated layers added to reduce heating to ⅓ or less the present uninsulated or uncovered structure heating costs. In addition, the advantages of the pressurized system are so great (especially low cost) that the present invention has the potential of developing into a standard system for commercial, backyard greenhouses, swimming pools and any structure requiring sunshine or the benefits of solar energy. It can also be used in implement storage areas to provide a warm dry environment by the double layers of polyethylene. On cloudy days or at night the insulation blanket could be used.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:

1. A structure comprising:
   (A) an enclosure having an outer light-transparent wall and an inner light-transparent wall spaced apart from said outer wall;
   (B) means for charging the space between said outer wall and said inner wall with air under pressure, said air having a dew point so selected that it will not allow condensation to occur;
   (C) an insulating layer disposed in, and bathed on both sides by said pressurized air space which is situated between said outer wall and said inner wall, said insulating layer comprising an insulating blanket which is disposed in said pressurized air space which is situated between said outer wall and said inner wall, said insulating blanket having a leading edge and a trailing portion and being movable between an extended covering position and a retracted stored position within an enclosed storage area;
   (D) operating means connected to said leading edge of said insulating blanket and positively operable to move said leading edge from its said retracted stored position to its said extended covering position; and
   (E) means operatively associated with said trailing portion of said insulating blanket and adapted to draw said insulating blanket from its said extended covering position to its said retracted stored position.

2. The structure of claim 1, wherein said trailing edge of said insulating blanket is provided with a ballast weight to draw said insulating blanket into said enclosed storage area which is constituted by a lower storage box.

3. The structure of claim 2 wherein said storage box is insulated.

4. The structure of claim 1 wherein said operating means includes a constant-tension rope system comprising two oppositely pulling ropes.

5. The structure of claim 1 wherein said operating means includes a constant-tension rope system comprising one continuous rope.

6. The structure of claim 1 wherein said insulating blanket extends substantially the entire longitudinal length of said structure.

7. The structure of claim 1 wherein said insulating blanket comprises a plurality of edge-butted insulating blanket batts.

8. The structure of claim 1 wherein said operating means includes a motor manually actuatable to move said insulating blanket to a selected position between its said extended covering position and its said retracted stored position, and to hold said insulating blanket at that selected position.

9. The structure of claim 1 wherein said means for charging the space between said outer light-transparent wall and said inner light-transparent wall with air under pressure comprises a fan, for inflating said space with outside air.

10. The structure of claim 1 wherein one longitudinal half of said structure has its insulating blanket in its said extended covering position while at the same time the other longitudinal half of said structure has its insulating blanket in its said retracted stored position.

11. The structure of claim 1 wherein one longitudinal half of said structure has its insulating blanket at an intermediate position between its said extended covering position and its said retracted stored position, while at the same time the other longitudinal half of said greenhouse has its insulating blanket at an intermediate position between its said retracted stored position and its said extended covering position.

12. The structure of claim 9 wherein said fan introduces said air under pressure into said enclosed storage area.

13. The structure of claim 12 wherein said outer light-transparent wall comprises a polyethylene sheet and wherein said inner light-transparent wall comprises a polyethylene sheet.

14. The structure of claim 12 wherein said outer light-transparent wall comprises a rigid roof and wall system of transparent plates between the base of said structure and the apex of the roof thereof; and wherein said inner light-transparent wall comprises a polyethylene sheet.

15. The structure of claim 14 wherein said fan introduces said air under pressure into said storage area.

16. The structure of claim 14 wherein said transparent plates comprise glass plates.

17. The structure of claim 14 wherein said transparent plates comprise sheet material made of a material selected from the group consisting of glass fibers, and acrylic plastics material.

18. The structure of claim 9 wherein said fan introduces said air under pressure into a header, said header being disposed at the apex crest of said structure, and being situated between said outer light-transparent wall and said inner light-transparent wall.

19. The structure of claim 1 wherein said insulating blanket includes a pair of sealing skins with a filling of insulating material therebetween.

20. The structure of claim 19 wherein one skin is formed of a pliable waterproof material.

21. The structure of claim 20 wherein one skin is formed of polyethylene or polyvinyl plastic.

22. The structure of claim 19 wherein one skin is formed of an aluminized material.

23. The structure of claim 19 wherein said filling of insulating material is formed of a structurally integral glass fiber blanket.

24. The structure of claim 19 wherein said insulating blanket is composed of a one skin of a pliable waterproof material and another skin of aluminized material.

25. The structure of claim 24 wherein a self-sustaining flexible pad of glass fibers is disposed between said skins.

26. The structure of claim 19 wherein said insulating blanket includes a further portion comprising a mesh material to provide shading to restrict the amount of light entering the greenhouse.

27. The structure of claim 1: wherein said enclosure comprises a self-supporting framework comprising a plurality of longitudinally spaced-apart frames, each frame having a pair of transversely spaced-apart bases, said outer light-transparent wall and said inner light transparent wall each being supported on said framework; wherein said insulating layer (C) is adapted to be stored within said enclosed storage area and wherein said enclosed storage area comprises a longitudinally extending storage box at each base of said frame; and (v) wherein said means (B) for charging said space comprises a fan for drawing dry air under pressure into said space between said inner light-transparent wall and said outer light-transparent wall.

28. The structure of claim 27 wherein said longitudinally spaced-apart frames comprise arched frames.

29. The structure of claim 28 wherein said fan introduces air into a header disposed at the apex crest of said arched frames between said outer light-transparent wall and said inner light-transparent wall.

30. The structure of claim 29 wherein said outer light-transparent wall and said inner light-transparent wall each comprise a polyethylene sheet.

31. The structure of claim 27 wherein said fan is connected to an upper header, and draws ambient outside air in through a vaned aperture in said storage box.

32. The structure of claim 27 wherein said fan is connected to a source of heated dry air.

33. The structure of claim 27 wherein said operating means (D) comprise at least one pair of oppositely pulling constant-tension ropes entraining a longitudinally extending roller driven by a reversing motor.

34. The structure of claim 33 wherein said reversing motor is automatically actuatable in response to a preselected cycle automatically to move said insulating blanket in response to predetermined positions of the sun with respect to said structure.

35. The structure of claim 27 wherein said means (E) comprises a ballast weight secured to said trailing edges of said insulating blanket, said ballast weight being disposed within said storage box.

36. The structure of claim 27 wherein said insulating blanket (C) comprises a plurality of edge-butted insulating blanket batts.

37. The structure of claim 27 wherein said longitudinally spaced-apart frames comprise "A" frames.

38. The structure of claim 37 wherein said fan is connected directly between outside ambient air to the interior of said lower storage box.

39. The structure of claim 38, wherein said fan is connected to a source of heated dry air.

40. The structure of claim 37 wherein said operating means (D) comprises a rope connected to the leading edge of said insulating blanket extending over a pulley and is wound on a winding shaft, and a second rope wound on said winding shaft in an opposite direction to said first rope, extending along the inner face of said inner light-transparent wall guided by pulleys thereon to said storage box, then around pulleys to extend along the outer surface of said insulating blanket to be secured to the leading edge thereof; and wherein said winding shaft is driven by a reversing motor.

41. The structure of claim 40 wherein said reversing motor is automatically actuatable in response to a preselected cycle automatically to move said insulating blanket in response to predetermined positions of the sun with respect to said structure.

42. The structure of claim 27 wherein said fan is connected directly between outside ambient air to the interior of said lower storage box.

43. The structure of claim 42 wherein said fan is connected to a source of heated dry air.

44. The structure of claim 27 wherein said operating means (D) comprises a rope secured to the inside edge of the leading edge of said insulating blanket, passes to a pulley within said pressurized air space and through a ridgeboard to a winding shaft outside said pressurized air space, downwardly guided by pulleys outside said pressurized air space to the bottom of said structure passing through said storage box to within said pressurized air space and along the outer surface of said insulating blanket, said winding shaft being driven by a reversing motor.

45. The structure of claim 44 wherein said leading edge of said blanket (C) is a pull bar.

46. The structure of claim 44 wherein said reversing motor is automatically actuatable in response to a preselected cycle automatically to move said insulating blanket (C) in response to predetermined positions of the sun with respect to said structure.

47. The structure of claim 1 wherein said blanket comprises a plurality of edge-butted insulating blanket batts.

48. The structure of claim 1 wherein said operating means includes a motor automatically actuatable in response to a preselected cycle automatically to move said insulating blanket in response to predetermined positions of the sun with respect to said structure.

* * * * *